United States Patent Office 2,983,259
Patented May 9, 1961

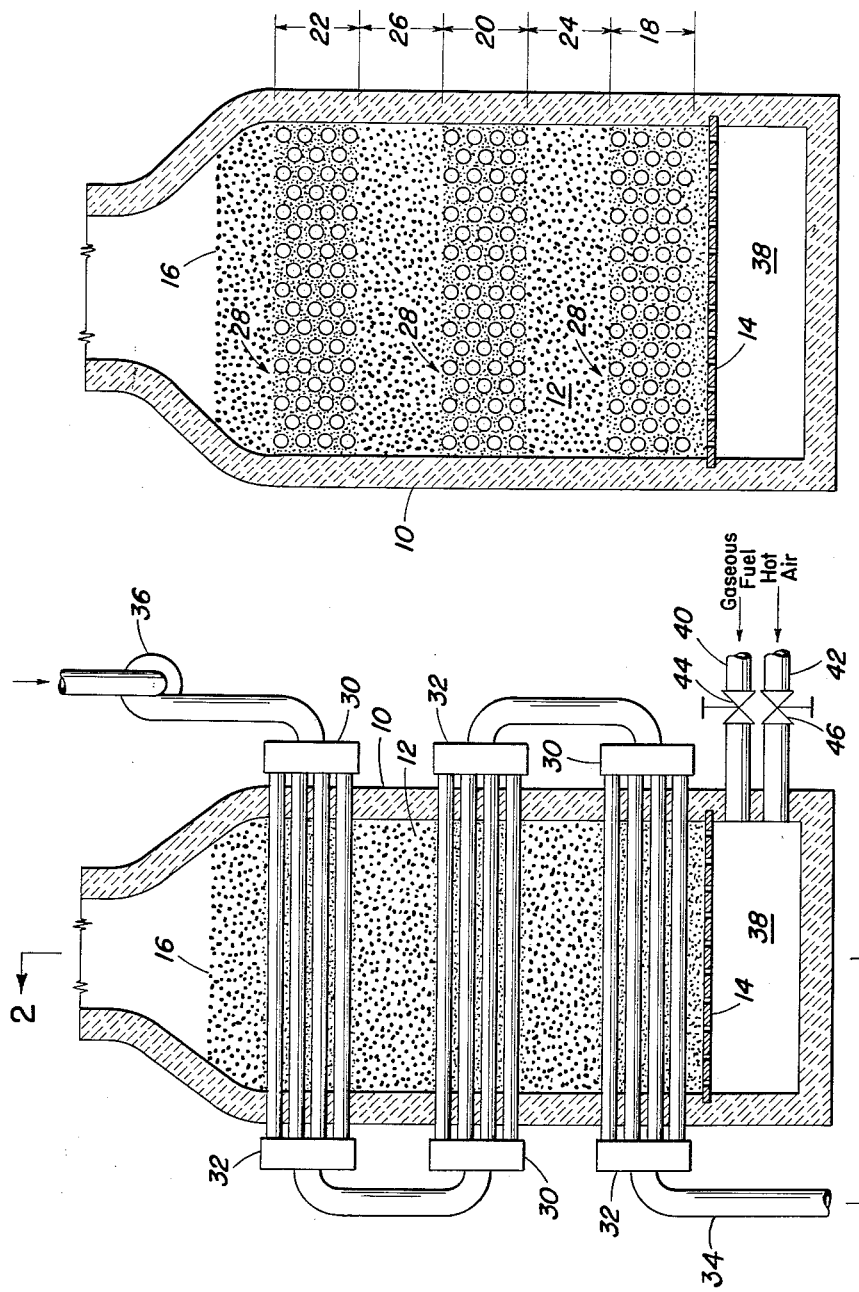

2,983,259

METHOD AND APPARATUS OF STEAM GENERATION

Ernest C. Wittke, Westbury, N.Y., assignor to Combustion Engineering, Inc., New York, N.Y., a corporation of Delaware Filed Feb. 9, 1955, Ser. No. 487,192

5 Claims. (Cl. 122—4)

This invention relates to an improved method and apparatus for the heating of fluids and is particularly concerned with such a method and apparatus wherein a fluidized discrete material is employed as a heat transfer medium.

A bed or mass of discrete material may be fluidized by passing a stream of gas upwardly therethrough with fluidization for a particular particle size occuring at or above a predetermined velocity. When in this fluidized state the particles of the material move rather rapidly throughout the body of the material with the entire mass being in an agitated state resembling a boiling liquid and with the violence of the agitation depending upon the velocity of the gas passing upwardly through the material. When in this fluidized state the material is not carried along with the fluidizing gas and although the body of material will be expanded from its packed condition the fluidizing gas passes through the material and leaves the same at what is termed a disengaging zone. With a given particle size the velocity of the gases passing through the material must be maintained within specific minimum and maximum limits in order to have the proper fluidization. The maximum limit is that where the fluidization is no longer uniform with blow holes or slugging being prevalent in the bed or with even a substantial quantity of the material being entrained within and carried away by the upwardly flowing gas stream, while the minimum limit is that below which fluidization does not occur with the mass of material remaining in the so-called packed condition and the particles not moving from their "at rest" position. Fluidization occurs over a rather narrow range of air flows and if the maximum permissible air flow that will produce said fluidization is identified as 100% the minimum permissible air flow that will produce fluidization will be in the neighborhood of 70% giving approximately only a range of 30%.

It is now recognized that it would be highly desirable to employ fluidized beds in heat exchange organizations such as boilers and the like because of the extremely high rates of heat transfer that prevails between the fluidizing gaseous medium and the heat exchange surface which is contacted by the material of the bed. However, because such a bed has a high thermal conductivity within itself there is a tendency for the hot portions of the bed to heat the relatively colder portions and thereby reduce the temperature differential that is obtainable within the bed. Thus, when a stream of hot heating gas is passed upwardly through and fluidizes a bed of the material within which heat exchange surface may be disposed, the high thermal conductivity within the fluidized bed tends to raise the temperature of the gases leaving the bed and accordingly limit the temperature to which these gases may be lowered which is contrary to the desired result of lowering the temperature of these gases as much as possible so that the maximum quantity of heat may be extracted therefrom. Because of this characteristic of a fluidized bed, if a steam generator, for instance had all of its heat transfer surface contacted by fluidized material in order to obtain the extremely high rates of heat transfer achieved by such fluidization, it would be necessary to provide numerous independent and separated beds of the material in order that the temperature of the heating gas, which would also be the fluidizing medium, could be reduced to a sufficiently low degree required for economic operation.

It is the purpose of the novel method and apparatus of the present invention to obviate this necessity of providing numerous independent beds in such an instant and to provide a single bed of material with which the necessary reduction in gas temperature may be had, with the invention making use of the rather limited range of velocities over which fluidization may be had and also taking advantage of the fact that while a fluidized bed of material has excellent heat conductivity through the bed a packed or non-fluidized bed of material has very poor heat conductivity therethrough and may be termed a heat insulator for the purpose of this invention.

In accordance with the present invention a vertical column of discrete material is formed within a suitable passageway or housing and upwardly through this column there is passed a stream of hot fluidized gas. The column is provided with vertically spaced heat exchange zones at which there is associated a heat exchange apparatus, such as tubes, for effecting transfer of heat from the fluidized gas to any other suitable medium such as water, which in the case of tubular heat transfer surface will be conveyed through the tubes. The free transverse area through which the fluidized gas may pass is not constant throughout the column of material but is substantially greater intermediate the vertically spaced heat exchange zones than it is at the heat exchange zones with the result that the velocity of flow of this gas through the heat exchange zones will be substantially greater than its velocity intermediate these zones. These relative areas are such that for the range of flows over which the apparatus or organization is to be operated, which must not exceed the 30% figure hereinbefore mentioned in order to have the material in the heat exchange zones fluidized, the velocity through the heat exchange zones is such that the material in these zones is fluidized while the velocity intermediate these zones is below that required for fluidization of the material wherefore the material in these zones remains packed or non-fluidized. In this matter the heat exchange zones are effectively thermally insulated from each other whereby each zone may have a substantially different mean temperature and whereby the temperature of the fluidizing gas may be greatly reduced upon its passage upwardly through the mass of material so that economic operation of an organization such as a steam generator may be provided.

In accordance with a preferred form of the invention the material in the lowermost heat exchange zone is preferably made up at least in part of an active oxidation catalyst so as to give this zone a sufficiently high catalytic activity that a fuel-air mixture may be introduced directly thereinto and effectively and efficiently oxidized therein, liberating heat and accordingly producing a hot stream of gases that pass upwardly through the material with a portion of this heat being absorbed in this zone as well as the heat exchange zones located above this zone. In order to have efficient and complete combustion or oxidation within a fluidized bed of practical height and with the combustion supporting gas being preheated to a reasonable degree it is essential that an active oxidation catalyst be employed so that the material has sufficient catalytic activity to effect complete oxidation of the fuel and it is further essential when the heat content of the fuel is at all substantial that means be provided in contact with the material of this bed for absorbing substantial quantities of heat from the fluidized material in order that the temperature of the material will not rise above the deactivation temperature of the catalyst employed, i.e., the temperature above which the catalyst is permanently damaged so that it loses all or a vast majority of its catalytic activity.

In the fluidized mass here contemplated the oxidation of the fuel within this mass of material takes place without the production of a flame with the catalysts that may be employed owing their activity to a physical structure and/or chemical constituents which require that they be used under such conditions that these special characteristics will not be destroyed. Examples of oxidation catalysts which are particularly suitable for use with the invention include activated forms of metal oxides impregnated with a minor amount of a metal in finely divided form. In particular, activated forms of alumina, beryllia, thoria, zirconia, or magnesia, or mixtures of these oxides, impregnated with minor amounts of finely divided metals such as platinum, palladium, rhodium, ruthenium, silver, copper, chromium, manganese, nickel, cobalt, or combinations of these metals such as silver-chromium, copper-chromium, copper-manganese combination, have been found to be especially suitable. Activated forms of these metal oxides may be prepared by controlled dehydration of a hydrated form of the oxide of the metal with the activated form of metal oxide thus produced having an extremely high porosity which results in a very large area being impregnated with the finely divided metal.

The activity of the catalysts of course varies in accordance with the characteristic of the metal with which the activated metal oxide is impregnated with certain metals, such as platinum, having an extremely high activity while other metals such as copper have a lower activity. The amount of metal impregnation that is required also varies with the characteristic of the metal with a greater amount of impregnation being required with metals of decreasing activity in order to produce a catalyst which is of acceptable activity.

In accordance with the invention a fuel-air mixture is introduced into this lowermost heat exchange zone which contains the oxidation catalyst preferably uniformly throughout its transverse section, with the rate of introduction being such as to fluidize the material in this zone. In passing upwardly through the mass of material in this zone the fuel is oxidized resulting in the liberation of heat with a portion of this liberated heat being absorbed by the heat exchange surface associated with this zone. The hot gases produced by the catalytic oxidation of this fuel-air mixture pass upwardly from this zone and through the material located thereabove with these gases causing the material in the upper vertically spaced heat exchange zones to be fluidized while the material intermediate these zones remains packed and with a portion of the heat in these gases being transferred to the heat exchange surface associated with each of these vertically spaced heat exchange zones as the gases pass through these zones. While there will be a certain loss in pressure or in other words, pressure drop in the gas stream during its passage through the packed material intermediate the heat exchange zones this is kept within permissible limits by maintaining the vertical height of these beds at the minimum that will provide effective thermal insulation between heat exchange zones.

It is an object of the present invention to provide an improved method and apparatus for effecting a transfer of heat with the employment of a fluidized heat transfer medium.

Other and further objects of the invention will be apparent to those skilled in the art as the following detailed description proceeds wherein reference will be had to the accompanying drawing which is a diagrammatic representation of a preferred form of the invention and wherein:

Fig. 1 is a vertical section through this preferred embodiment showing the vertical spacing of the heat exchange zones in the vertically disposed column of discrete material; and Fig. 2 is a sectional view taken along line 2—2 of Fig. 1.

Referring now to the drawing, wherein like reference characters are used throughout to designate like elements, the illustrated organization disclosed therein is in the form of a steam generator comprising a vertical housing or passageway 10 within which is disposed the column of discrete material 12 which rests upon the perforate support plate 14 and the upper level of which is indicated as 16. Vertically spaced throughout the column of material 12 are the heat exchange zones 18, 20, and 22 with zones 18 and 20 being separated by the insulating zone 24 and zones 20 and 22 being separated by the insulating zone 26.

The free transverse area of passageway 10 at each of the heat exchange zones 18, 20, and 22 is substantially less than that of the insulating zones 24 and 26 with this being accomplished in the illustrated organization by positioning tube bundles 28 in these heat exchange zones with each tube bundle being made up of tubes extending horizontally across the passageway at these heat exchange zones and interconnected at their opposite ends with inlet and outlet headers 30 and 32 respectively, with the outlet headers of the uppermost tube bundle being connected with the inlet headers of the intermediate tube bundle and the outlet headers of the intermediate tube bundle being connected with the inlet headers of the lowermost tube bundle so that fluid flows from the uppermost bundle through the intermediate bundle and thence through the lowermost bundle from which it may be conveyed to a desired point through a conduit 34, with this circulation preferably being established by means of pump 36.

In the case of a steam generator, heat exchange zone 22 may function as the economizer section while zones 20 and 18 may be steam generating sections; or 20 may be the steam generating section and 18 the superheater section; or any other desired operational arrangement may be employed which will produce an efficiently operating organization.

A gaseous fuel and preheated air are introduced into chamber 38 beneath plate 14 where they become mixed and then pass through the perforations that are distributed uniformly over the area of this plate and into the discrete material in zone 18. The material in this zone is made up, at least in part, of an oxidation catalyst so that the overall activity of this material is sufficient to catalytically oxidize the fuel-air mixture as it passes through this zone. The rate of introduction of this fuel and air is sufficient to fluidize the material in zone 18 so that a very high heat transfer rate prevails between the gases passing through this zone and the tubes of bundle 28 disposed in the material of the zone. Upon leaving zone 18 the hot gases produced by this catalytic oxidation pass through the insulating zone 24 and because the free transverse area of passageway 10 in this zone is substantially greater than that at zone 18, due to the absence of tube bundle 28, the velocity of these gases passing through zone 24 is not sufficient to fluidize the material in this zone and this material remains in its packed condition where it is very effective to prevent thermal conductivity from the material in zone 18 to the material in zone 20. After passing through the packed or non-fluidized material in zone 24 these gases then serially pass through the material in heat exchange zone 20, insulating zone 26 and exchange zone 22 with these gases becoming disengaged from the bed or column of material at its upper level 16 and thereafter pass through an air heater, directly to a stack or to any other desired location. In passing through heat exchange zones 20 and 22 the velocity of these gases is sufficient, because of the effective decrease at the free transverse area of passageway 10 at these zones due to the tube bundles 28, to fluidize the material in these zones while the velocity of these gases through zone 26 is below that required for fluidization of the material in this zone. As a result of this organization each of the heat exchange zones is effectively thermally insulated from those above and below it so that the temperature of the gases leaving the column of material 12 at its upper level 16 will be substantially lower than the temperature of the gases passing through zone 18 and may be lowered to permit economic operation of the organization as a steam generator.

The supply of fuel and air through conduits 40 and 42 is controlled by valves 44 and 46, respectively, with this fuel and air supply being regulated so as to regulate the heat input to the fluid flowing through bundles 28. However, this regulation is limited to the rather narrow 30% range hereinbefore mentioned over which fluidization of the material will be had and if it is desired to obtain the maximum range of possible regulation the relatively free transverse areas of passageway 10 at the insulating zones 24 and 26 and the heat exchange zones 18, 20, and 22 must be such that the velocity in the insulating zones remains below that required for fluidization throughout this range while the velocity in the heat exchange zones remains within what which will produce fluidization throughout this range with these relative areas being determined in the illustrative organization merely by the number, size and spacing of the tubes of each of the bundles 28 which are associated with the heat exchange zones with the more tubes in each of the bundles resulting in decreasing the effective free area of the passageway at the heat exchange zone with which the particular tube bundle is associated. Thus zones 24 and 26 are the packed, nonfluidized or quiescent zones of the bed while zones 18, 20 and 22 within which heat exchange surface is disposed are fluidized zones with the quiescent or packed zones of course being of greater density than the fluidized zones.

Since the weight rate of air flow for fluidization varies inversely as the square root of the absolute temperature, in order to have the same degree of fluidization in each of the heat exchange zones the effective free area of passageway 10 at zone 20 should be less than that at zone 18 because of the lower temperature of the fluidizing gases passing through zone 20 and likewise the effective free transverse area of passageway 10 at zone 22 should be less than that at zone 20 because of the further decrease of the temperature of these fluidizing gases. This relationship in the free areas of the heat exchange zones may be expressed by the equation $A_2 = A_1\sqrt{T_2/T_1}$ where $A_2$ is the free area of the zone immediately upstream of the zone whose free area is $A_1$ with $T_2$ and $T_1$ being the mean absolute temperature of the gases at these respective zones. The progressive decrease in free area of the successive heat exchange zones in accordance with this relationship may be accomplished simply by increasing the tube diameter, reducing the horizontal spacing or both.

The fuel and gaseous combustion supporting medium applicable with the present invention are not limited to a gaseous fuel and air as identified in the drawing since any suitable fuel may be employed such as oil or a pulverized solid fuel and since other combustion supporting mediums such as pure oxygen, oxygen enriched air and other oxygen containing gases may be employed and it is to be understood that the terms fuel and air as used throughout this application include such fuels and combustion supporting medium.

While the invention is particularly well adapted for the generation of steam in that an efficient operating organization is produced for this purpose, the invention is not limited to such uses and may be employed in other and different heat exchange organizations where it is desired to obtain high operating efficiency with the the use of a fluidized heat exchange medium without requiring numerous separate and independently supported beds.

The invention is also applicable to installations and organizations wherein the gases are produced in a manner other than the catalytic oxidation of a fuel-air mixture within a fluidized medium, for instance, the hot gases may be those emanating from a blast furnace, internal combustion engine, gas turbine, or any other apparatus which will produce substantial quantities of high temperature gases with these gases being passed through a column of material formed of heat zones according to the present invention whereupon the organization may be functioning as a waste heat boiler.

It will thus be seen that a novel method and apparatus is employed whereby the temperature of a hot fluidizing gas that is passed upwardly through a bed of material may be reduced to a desired value in a single column of the material and where the effect of the very high heat transfer rate that prevails in a fluidized bed and tends to give a constant temperature throughout the bed may be overcome without the necessity of providing independent and separately supported beds.

This description is intended for the purpose of explanation and illustration only and is not to limit the invention since many modifications which are within the scope and spirit of the invention, will occur to those skilled in the art.

I claim:

1. In the method of transferring heat from a gaseous heating medium to a fluid to be heated with the heat transfer being aided by means of a discrete material heat transfer medium the improvement comprising forming a column of said material, passing said fluid in indirect heat exchange relationship with said material in vertically spaced zones in said column, restricting the transverse area of said column at such zones relative to that intermediate said zones, and passing the gas upwardly through said column at such a rate that the velocity thereof in said zones of restricted transverse area is sufficient to fluidize said discrete material in said zones while the velocity thereof intermediate said zones is insufficient to fluidize said discrete material.

2. The method of heating comprising passing a hot heating gas upwardly through a column of solid particulate matter, passing a fluid in indirect heat exchange relation with said material at a given horizontal location in said column, passing a fluid in indirect heat exchange relation with said material at a location vertically spaced from the first mentioned location, restricting the transverse area of said column at said locations relative to that intermediate said locations sufficiently so that the velocity of said gas at said locations is within the range required for fluidization of the particulate matter while that intermediate said locations is below said range.

3. The method of heating comprising forming a column of discrete material that includes, at a location adjacent the lower end of said column, an active oxidation catalyst, introducing fuel and a combustion supporting gas into said column of material at said location and catalytically oxidizing said fuel therewithin flowing the gases resulting from such introduction and catalytic oxidation upwardly through said column of material, imparting heat to a fluid by passing it in indirect heat exchange relation with the material of said column at vertically spaced locations in said column including the location of the introduction and catalytic oxidation of said fuel, regulating the introduction of said fuel and combustion supporting gas, and restricting the transverse area of said column at said locations relative to that intermediate said locations so that the velocity of the upwardly passing gases at said locations is sufficient to fluidize the discrete material thereat while the velocity of the upwardly passing gases intermediate said locations is below that required for fluidization of the material thereat with the temperature of the catalyst being maintained below its deactivation temperature.

4. In an organization of the type described the combination of a body of discrete material upwardly through which a gas is passed with the volume of flow thereof being regulated within predetermined limits, said body of material including vertically spaced heat absorption zones within which is disposed heat transfer surface with said heat transfer surface being so constructed and arranged that the resulting free area in said zones transversely of the direction of movement of said gas is such relative to the particle size of the discrete material and is so related to the corresponding area between said zones that the material in said zones is fluidized while the material between said zones is not fluidized when said gas flow is within said predetermined limits.

5. In an organization of the type described the combination of a body of discrete material upwardly through which a hot heating gas is passed with the rate of flow thereof being regulated within predetermined limits, said body of material including vertically spaced heat absorption zones within which is disposed heat transfer surface with said heat transfer surface being so constructed and arranged that the resulting free area in said zones transversely of the direction of movement of said gas is such relative to the particle size of the discrete material and is so related to the corresponding area between said zones that the material in said zones is fluidized while the material between said zones is not fluidized when said gas flow is within said predetermined limits and with the area of a downstream zone relative to the flow of said gases being related to that of the adjacent upstream zone generally in accordance with the equation $$A_2 = A_1 \sqrt{\frac{T_2}{T_1}}$$

where $A_1$ is the area at the upstream zone, $A_2$ is the area at the adjacent downstream zone, and $T_1$ and $T_2$ the mean absolute temperature of the gas at the respective upstream and downstream zones.

References Cited in the file of this patent

UNITED STATES PATENTS

| | | |
|---|---|---|
| 2,289,682 | Rasor | July 14, 1942 |
| 2,610,842 | Schoenmakers et al. | Sept. 16, 1952 |
| 2,621,118 | Cyr et al. | Dec. 9, 1952 |
| 2,676,668 | Lindsay | Apr. 27, 1954 |
| 2,729,428 | Milmore | Jan. 3, 1956 |